Jan. 9, 1923. 1,441,309.
V. TORNABENE.
DEMOUNTABLE RIM OR THE LIKE.
FILED DEC. 27, 1919.
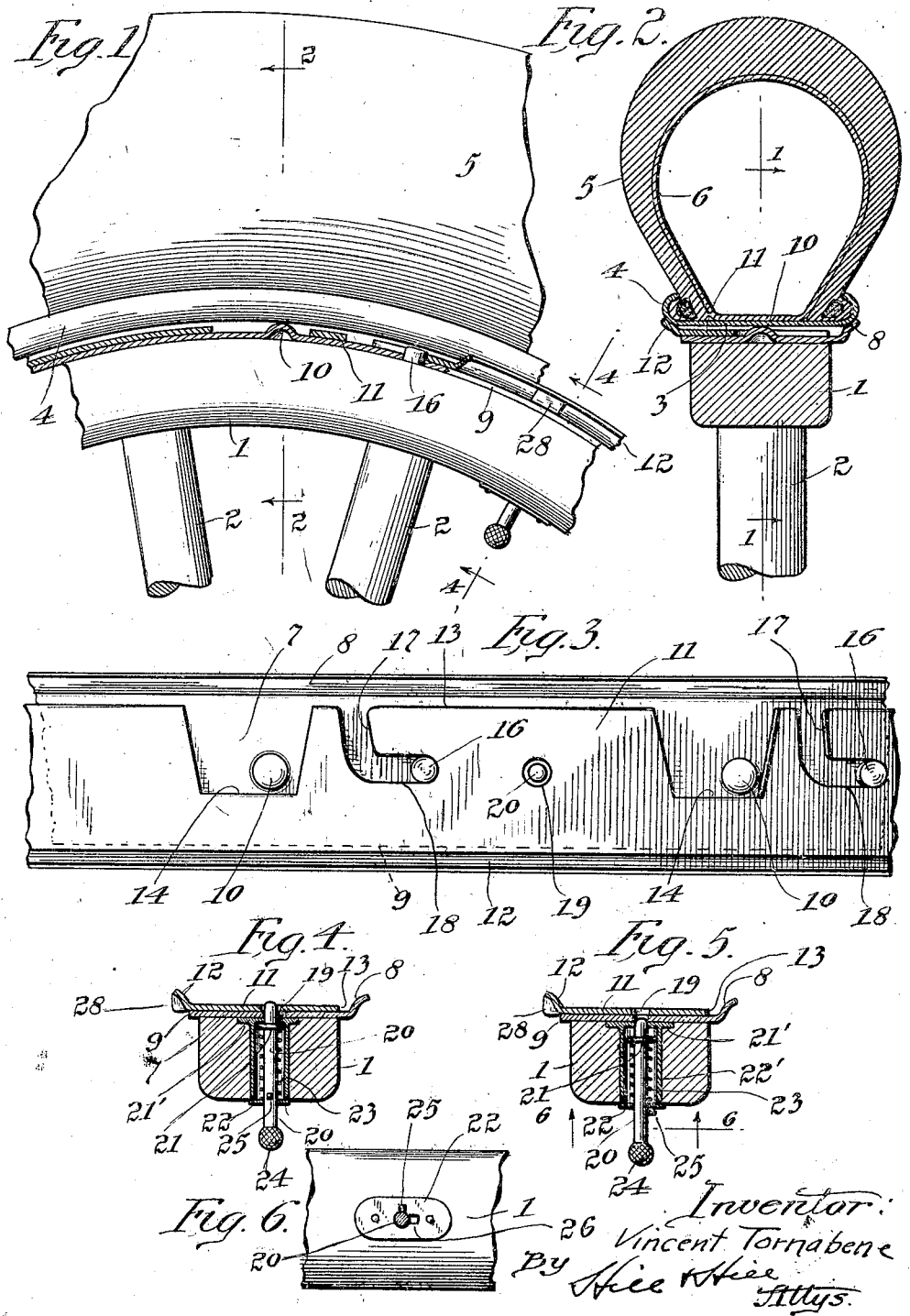
Inventor:
Vincent Tornabene
By Hiee & Hiee
Attys.

Patented Jan. 9, 1923.

1,441,309

UNITED STATES PATENT OFFICE.

VINCENT TORNABENE, OF CHICAGO, ILLINOIS.

DEMOUNTABLE RIM OR THE LIKE.

Application filed December 27, 1919. Serial No. 347,723.

*To all whom it may concern:*

Be it known that I, VINCENT TORNABENE, a citizen of the United States, residing at Chicago, in the county of Cook and State of Illinois, have invented certain new and useful Improvements in Demountable Rims or the like, of which the following is a description.

My invention belongs to that general class of devices known as demountable rims and relates more particularly to an improved construction or device for detachably securing the rim and inflated tire on the felly. The invention has among its objects the production of a device of the kind described, without nuts or bolts, that is simple, convenient, durable, efficient, safe and satisfactory for use, wherever found applicable. It has among its further objects the production of a device of the kind described, which will secure the demountable rim on the wheel without necessitating the use of and necessary tightening of nuts ordinarily used or removal of the same when the rim is removed. Many other objects and advantages of the construction herein shown and described will be obvious from the disclosure herein made.

To this end my invention consists of the novel construction, arrangement and combination of parts herein shown and described and more particularly pointed out in the claims.

In the drawings, wherein like reference characters indicate like or corresponding parts, Figure 1 is a sectional view taken substantially on line 1—1 of Figure 2.

Figure 2 is a sectional view taken substantially on line 2—2 of Figure 1.

Figure 3 is a plan view of my improved rim securing means, the demountable rim removed.

Figure 4 is a sectional view taken substantially on line 4—4 of Figure 1.

Figure 5 is a similar view showing the locking member out of operative position, and Figure 6 is a sectional view taken substantially on line 6—6 of Figure 5.

Referring to the drawings, 1 represents the wheel felly and 2 the spokes, it being understood that the same may be made of any suitable material and be of the desired size and shape. The demountable rim 3 shown is provided with the edge flanges 4 arranged to engage the beads on the casing 5, within which is arranged the inner tube 6. It may be mentioned that it is immaterial in so far as the present invention is concerned how the flange portions 4 are constructed, this ordinarily depending upon the style or type of tire, as, for example, straight side, clincher, etc.

Arranged on the felly 1 is a rim part 7 which is preferably formed with a flange 8 on the inner side. The rim part 7 is of such size or width in the preferred construction that the edge 9 extends to the opposite side of the felly from the flange 8. Part 7 is also provided with the desired number of projections 10 or the equivalent which are arranged to engage with the center of the rim 3, as most clearly shown in Figures 1 and 2. It is immaterial how part 7 is secured in the felly. Arranged to cooperate with the rim part 7 is a rim part 11 which is preferably flanged as at 12 on the outer edge, the same corresponding with the flange 8 on the other rim part, the rim being of a size to slip over part 7 and of a width so that the edge 13 extends to a point substantially adjacent the flange 8. The rim part 11 is provided with cut-out portions 14 and 15. The cut-out portions 14 provide clearance for the projections 10. Arranged on one rim part, as shown on the rim part 7, are pins or lugs 16, or the equivalent, of the desired size and shape, which are arranged to engage in the slots 18 formed in the other rim part, as shown on part 11, and adjacent the cut-out portions 15. It will be noted that the one edge 17 is substantially cam shaped, the purpose of which will be more fully explained hereafter.

The rim part 11 as shown is provided with one or more holes or openings 19 and the felly 1 is provided with one or more locking members or bolts 20 arranged to engage thereat, (only one bolt 20 is shown). Locking member or bolt 20 is shown provided with a collar 21 or flange, and extends through a plate 22 secured on the felly, the same being maintained normally in the position shown in Figure 4 by a spring 23 bearing against the flange 21 and plate 22. The locking member 20 is shown with an end 24 conveniently formed for grasping and withdrawing the locking member when required. As most clearly shown in Figures 4, 5 and 6, the member is provided with a lug 25 and plate 22 with the cut-out or notch 25, so that when the bolt 20 is turned to register the lug 26 with the notch 25, the bolt may be withdrawn as shown in Figure 5 and if given a slight turn will be maintained in its withdrawn position. If desired one or more lugs 28 may be arranged on the rim part 11 for convenience in manipulating the rim part 11. A plate 21' and sleeve 22' may be employed if desired.

The operation of the device may be briefly described as follows: Assuming that rim 3 and the tire carried thereby, as well as rim part 11, are removed from the wheel and bolt 20 withdrawn. To apply the rim 3 and parts carried thereby to the wheel, rim 3 is seated substantially as shown in Figure 2. Rim part 11 is then positioned and pushed into place between the rim parts 3 and 7, it also at the same time being given a slight turning movement. That is to say one or the other of rim parts 7 and 11 is turned relatively the other, so that the pins 16 engage in notches 18. Turning the parts also draws the part 11 inwardly, as the pins engage faces 17. Locking bolt 20 is then turned and permitted to take its normal locking position as shown in Figure 4, preventing relative turning or sliding movements of the rim parts. If necessary rim part 11 may be slightly tapped with a hammer or the like, the lugs 28, of which there may be any number, affording convenient faces to be engaged to turn the rim part. To remove the rim 3 the operations just described are reversed. It may be mentioned that if the slot 15 is formed with a cam face, as indicated in the dotted line X, turning the rim part 11 back relative to part 7, it will also have a tendency to cause part 11 to withdraw from operative position. It will be seen from the preceding that it is possible to remove one rim and replace another one on the wheel without the use of wrenches, as there are no nuts, bolts or the like to be removed, nor a plurality of loose parts to become mislaid or lost. Withdrawing the locking bolt 20, and it may be mentioned that there may be any number of bolts 20 provided, releases the entire mechanism. However it will be noted that there is practically no strain on bolt 20 as the strain is taken by the pins or lugs 16.

Having thus described my invention, it is obvious that various immaterial modifications may be made in the same without departing from the spirit of my invention, hence I do not wish to be understood as limiting myself to the exact construction, arrangement, combination of parts or uses mentioned except as defined by the claims hereunto appended.

What I claim as new and desire to secure by Letters Patent is:

1. In a device of the kind described and in combination, a demountable rim for carrying the tire and means for detachably securing the same to the wheel felly comprising a rim part constructed to be mounted on the wheel felly, a cooperating part of a size to fit over the first mentioned part, one part provided with projecting parts on one face and the other rim part constructed to engage therewith, whereby the cooperating rim part may be secured in operative relation with the first rim part by pushing in place and thence turning slightly relatively the other, said second mentioned rim part having projections thereon engaging the inner periphery of said demountable rim to space it above said first mentioned part and to transmit the thrust from the demountable rim directly to the felly.

2. In a device of the kind described and in combination, a demountable rim for carrying a tire and means for detachably securing the same to the wheel felly comprising a rim part constructed to be mounted on the wheel felly, a cooperating part of a size to fit over the first named part, one rim part provided with projecting parts on one face and the other part constructed to engage therewith, whereby the cooperating rim part may be secured in operative relation with the first rim part by pushing in place and thence turning slightly relatively the other, said second mentioned rim part having projections thereon engaging the inner periphery of said demountable rim to space it above said first mentioned part and to transmit the thrust from the demountable rim directly to said felly, said first mentioned rim part having portions cut away laterally, opening on one edge and adapted to engage said projections on said second mentioned rim part.

3. In a device of the kind described and in combination, a demountable rim for carrying the tire and means for detachably securing the same to the wheel felly, comprising a felly rim secured to the felly and flanged at its sides, said felly rim constructed in two parts, each having one flange and means for detachably securing one part to the other upon sliding the rim parts together, one around the other, and slightly turning one part relative the other, one of said rim parts having projections thereon engageable with the inner periphery of said demountable rim to receive the radial thrust therefrom and transmit it directly to the felly, and also serving to space the bottom of said demountable rim above the upper surface of said felly rim parts, and means for normally preventing said turning movement when the parts are in operative relation, comprising a bolt projected through the felly and engaging said rim parts, means for normally maintaining said bolt in operative position, and means for maintaining the same in inoperative position as desired.

In testmony whereof, I have hereunto signed my name in the presence of two subscribing witnesses:

VINCENT TORNABENE.

Witnesses:
  BURTON W. HILLS,
  BLANCHE CHALMERS.